United States Patent
Zheng

(10) Patent No.: US 8,233,791 B2
(45) Date of Patent: Jul. 31, 2012

(54) METHODS, SYSTEMS, AND COMPUTER READABLE MEDIA FOR PROVIDING VIRTUAL 1:N AUTOMATIC PROTECTION SWITCHING (APS) AND DYNAMIC, IN SERVICE CONFIGURATION CHANGE FOR OPTICAL NETWORK INTERFACE EQUIPMENT

(75) Inventor: Ping Zheng, Allen, TX (US)

(73) Assignee: Genband US LLC, Plano, TX (US)

( * ) Notice: Subject to any disclaimer, the term of this patent is extended or adjusted under 35 U.S.C. 154(b) by 413 days.

(21) Appl. No.: 12/489,264

(22) Filed: Jun. 22, 2009

(65) Prior Publication Data

US 2010/0322618 A1 Dec. 23, 2010

(51) Int. Cl.
*H04B 10/08* (2006.01)
(52) U.S. Cl. ............... 398/12; 398/17; 398/19
(58) Field of Classification Search .......... 398/2–5, 398/10–13, 17–21, 33
See application file for complete search history.

(56) References Cited

U.S. PATENT DOCUMENTS

| | | | |
|---|---|---|---|
| 2004/0161232 A1* | 8/2004 | Kerfoot, III | 398/5 |
| 2005/0013532 A1* | 1/2005 | Heiles et al. | 385/16 |
| 2005/0195737 A1* | 9/2005 | Rajan et al. | 370/216 |
| 2006/0050631 A1* | 3/2006 | Koyuncuoglu et al. | 370/217 |

OTHER PUBLICATIONS

International Telecommunication Union, "Types and Characteristics of SDH Network Protection Architectures, Series G: Transmission Systems and Media, Digital Systems and Networks, Digital Transmission Systems—Digital Networks—SDH Network Characteristics," ITU-T Telecommunication Standardization Sector of ITU, G.841 (Oct. 1998).

* cited by examiner

*Primary Examiner* — Dzung Tran
(74) *Attorney, Agent, or Firm* — Jenkins, Wilson, Taylor & Hunt, P.A.

(57) ABSTRACT

The subject matter described herein includes providing virtual 1:N automatic protection switching and dynamic, in service configuration change for optical network interface equipment. According to one aspect of the subject matter described herein, a method for providing virtual 1:N automatic protection switching (APS) for optical network interface equipment is disclosed. The method includes configuring N optical network interface cards (ONICs) as working cards, each working card having sending and receiving optical interfaces, wherein N is an integer greater than 1. A single ONIC is configured as a protection card for providing N optical interfaces for providing redundant interface protection for each of the optical interfaces on the N working cards. In response to detecting a failure of one of the N working cards or a failure of one of the optical interfaces on one of the N working cards, optical networking communications that would have been sent to or received by the failed card are automatically sent and received using a protecting interface on the protection card that is associated with the failed card.

18 Claims, 13 Drawing Sheets

METHODS, SYSTEMS, AND COMPUTER READABLE MEDIA FOR PROVIDING VIRTUAL 1:N AUTOMATIC PROTECTION SWITCHING (APS) AND DYNAMIC, IN SERVICE CONFIGURATION CHANGE FOR OPTICAL NETWORK INTERFACE EQUIPMENT

TECHNICAL FIELD

The subject matter described herein relates to automatic protection switching in optical network interface equipment. More specifically, the subject matter relates to methods, systems, and computer readable media for providing virtual 1:N automatic protection switching and dynamic, in service configuration change for optical network interface equipment.

BACKGROUND

In optical network equipment that includes one or more optical network interface cards (ONICs), various schemes for automatic protection switching (APS) provide a secondary interface (i.e., protecting interface) for each of the one or more primary interfaces (i.e., working interfaces) in a particular optical network device. For example, in the event of a failure of a working interface, traffic may be switched from a working interface to its associated protection interface using an APS protocol. As used herein, the term "APS protocol" refers to one or both of the Bellcore GR 253 optical network standard in North America and the International Telecommunications Union (ITU) G.841 optical network standard internationally, the disclosures of which are incorporated by reference herein in their entireties.

A first category of APS configurations includes 1+1 and 1:1 protection schemes for optical network devices. In 1+1 and 1:1 protection configurations, a 1-to-1 ratio exists between working interfaces and protection interfaces. The main difference between 1+1 and 1:1 protection schemes is that 1+1 protection can be configured as both unidirectional and bi-directional protection whereas 1:1 protection can be configured as bi-directional only. A protection system is bidirectional if both local and far end equipment perform traffic switchover together. In other words, if the local equipment has switched over, the far end is required to perform switchover as well. Conversely, a protection system is unidirectional if local and far end equipment can perform switchover independently of each other. Furthermore, there are two important subtypes of 1+1 APS which are discussed below.

1+1 equipment protection (hereinafter, "equipment protection") requires that working interfaces and protection interfaces be located on different ONICs. Advantages of equipment protection include high reliability because a failure of the working card will not cause a failure of the protection card. However, because equipment protection requires a separate protection card for each working card, the cost is typically expensive.

For example, FIG. 1A illustrates an exemplary conventional equipment protection scheme according to the prior art. Referring to FIG. 1, working card 100 (i.e., W1) includes two working interfaces—Rx1 102 and Tx1 104—for receiving and transmitting synchronous optical networking (SONET) and/or synchronous digital hierarchy (SDH) communications via a fiber optic cable or other suitable transmission medium. Protection card 106 includes two corresponding protecting interfaces 108 and 110, for protecting working interfaces 102 and 104, respectively, in the event of failure. Protection card 106 is located on a separate ONIC from working card 100 and is responsible for handling traffic for working card 100 in the event of a failure of one of receiving interfaces 102 and/or working card 100. Thus, receiving protecting interface 108 on protection card 106 is associated with receiving working interface 102 on working card 100 as indicated by dashed line 112. Similarly, transmitting protecting interface 110 on protection card 106 is associated with transmitting working interface 104 on working card 100 as indicated by dashed line 114.

FIG. 1B illustrates a more detailed schematic view of a conventional 1+1 equipment protection scheme according to the prior art. Referring to FIG. 1B, working card 100 and protecting card 106 may each include O/E converters and data payload processors for processing optical network traffic. For example, cards 100 and 106 may include O/E converters 116 and 118 and payload processors 120 and 122, respectively. Cards 100 and 106 may send and receive optical network traffic via sending and receiving interface pairs 124 and 126, and 128 and 130, respectively. Working card 100 may be connected to protecting card 106 via midplane 132 using a suitable communications bus. Midplane 132 may include one or more bridges and selectors for directing traffic between working card 100 and protecting card 106. For example, in the configuration shown in FIG. 1B, bridge 134 is a permanent bridge such that outbound communications from protecting card is always tied to protecting card 106. Relatedly, selector 136 is shown in a position that data received from working card 100 is allowed to pass through midplane 132 whereas data received from protecting card 106 is not because working card 100 is operational and has not experienced a failure event or condition requiring that switchover be performed.

In contrast to equipment protection, which requires that the working and protection interfaces be located on different ONICs, 1+1 facility protection (hereinafter, facility protection") requires that the working and protection interfaces be located on the same ONIC. FIG. 2 illustrates an exemplary facility protection scheme. Referring to FIG. 2, ONIC 200 includes a first pair of working optical fibers 202 and 204 for receiving and transmitting information, respectively. Also located on the same ONIC 200, corresponding protecting optical interfaces 206 and 208 provide backup interfaces for working interfaces 202 and 204, respectively. Again, the 1-to-1 relationship between working and protection interfaces is indicated by dashed lines 210 and 212 representing associations between receiving interfaces 202 and 206 and transmitting interfaces 204 and 208, respectively.

Advantages of facility protection include that it is cheaper to implement than equipment protection because fewer cards and midplane slots are required as compared to equipment protection. However, facility protection is less reliable than equipment protection because if a ONIC fails, both working and protection interfaces may be affected and, as a result, traffic may be lost.

In order to address the inherent deficiencies associated with conventional 1+1 protection, conventional 1:N (aka, 1-to-N) protection may be used. Conventional 1:N protection provisions one redundant interface for each of N working interfaces, where N is an arbitrary, user-determined value that may be dictated by the particular device configuration and traffic demands (i.e., 1:1 is just a special case of 1:N). As used herein, 1:N and 1-to-N are intended to refer to the same APS configuration (i.e., one protecting interface protecting N working interfaces), where 1:N protection for an optical network is always bidirectional protection.

FIG. 3 illustrates an exemplary conventional 1:N protection scheme. Referring to FIG. 3, a plurality of working ONICs 300, 302 and 304 may each contain receiving optical interfaces 306, 308, and 310, respectively, as well as transmitting optical interfaces 312, 314, and 316, respectively. Protection card 318 may include a single receiving protection interface 320 and a single transmitting protection interface 322. Receiving protection interface 320 may protect interfaces 306, 308, and 310 and transmitting protection interface 322 may protect interfaces 312, 314, and 316. These associations are indicated by dashed lines 324 and 326, respectively. Thus, a single protection interface (e.g., receiving protection interface 320) may protect N (e.g., three) working interfaces (e.g., interfaces 306, 308, and 310).

FIG. 4 is a schematic diagram of an exemplary conventional 1:N APS configuration. Referring to FIG. 4, N working cards and their associated protecting card may each include an optical/electrical (O/E) converter for converting between optical, which may be used for transmission between local and far end equipment, and electrical signals, which may be used internally by each card. For example, working cards 300, 302, and 304 and protecting card 318 may include O/E converters 400, 402, 404, and 406, respectively. Specifically, O/E converter 400 may convert an electrical signal to an optical signal (e.g., SONET/SDH) for transmission using outbound optical interface 408 or, alternatively, may convert an optical signal to an electrical signal that is received on inbound optical interface 410. Likewise, O/E converters 402, 404, and 406 may convert between signals transmitted or received on optical links 412, 414, 416, 418, 420, and 422 as indicated in FIG. 4. Each of cards 300-304 and 318 may also include a digital payload processor for processing signals received from O/E converters 400-406, respectively. For example, cards 300-304 and 318 may include payload processors 408, 410, 412, and 414, respectively, which may include any suitable hardware for executing instructions stored on a computer readable medium.

Each of working cards 300-304 and protecting card 318 may be connected to a midplane or backplane for communicating between them. For example, midplane 416 may include multiple internal communications interfaces (e.g., PCI slots) for connecting together cards 300-304 and 318. Midplane 416 may also include one or more systems for controlling which working card is connected to the protecting card, thereby determining which working card may currently be switched over to the protecting card.

As may be appreciated, unidirectional APS is possible if outbound data is permanently bridged to the working and protecting cards at both local and far end equipment. A permanent bridge allows the far end to receive identical data on its working and protecting cards. Thus, if a switchover is needed by the far end, it only needs to select the inbound data from its standby card and the far end switchover does not require the local end to perform any action. Likewise, since the far end has permanent bridge for its outbound data, local switchover is also independent of the far end equipment. However, a conventional 1:N optical APS system may only work in bi-directional fashion because a permanent bridge is not possible because the protecting card does not know beforehand which working card to bridge traffic for.

The APS system shown in FIG. 4 is in "standby mode" where no switchover is being performed and therefore bridge controllers 418-422 are each in an open position. As a result, outbound data is not received by protecting card 318. If traffic switchover is desired for working card 302, for example, then bridge controller 420 will close, and selector 426 will switch to the inbound interface of protecting card 318. As may be appreciated from FIG. 4, working cards 300-304 and protecting card 318 are built exactly the same and traffic switchover is performed completely on the midplane.

An advantage of conventional 1:N protection is that it is more reliable than facility protection because working and protecting interfaces are located on separate cards. Conventional 1:N protection is also cheaper than equipment protection because fewer protection cards are required to protect multiple working cards (i.e., N>1).

However, 1:N protection is typically complex to implement because it requires synchronized switchover actions on both local and remote optical network equipment. Specifically, in order to perform synchronized switchover, the complex APS protocols described above requiring strict compliance must be used. Due to the complexity associated with conventional 1:N protection schemes, few optical network equipment vendors support 1:N protection and its commercial deployment is virtually non-existent.

Accordingly, in light of these difficulties, a need exists for improved methods, systems, and computer readable media for automatic protection switching for optical network interface equipment.

SUMMARY

The subject matter described herein includes providing virtual 1:N automatic protection switching and dynamic, in service configuration change for optical network interface equipment. According to one aspect of the subject matter described herein, a method for providing virtual 1:N automatic protection switching (APS) for optical network interface equipment is disclosed. The method includes configuring N optical network interface cards (ONICs) as working cards, each working card having sending and receiving optical interfaces, wherein N is an integer greater than 1. A single ONIC is configured as a protection card for providing N optical interfaces for providing redundant interface protection for each of the optical interfaces on the N working cards. In response to detecting a failure of one of the N working cards or a failure of one of the optical interfaces on one of the N working cards, optical networking communications that would have been sent to or received by the failed card are automatically sent and received using a protecting interface on the protection card that is associated with the failed card.

A method for dynamic, in-service automatic protection switching (APS) configuration change between equipment protection and facility protection schemes is also disclosed. The method includes detecting a first, troubled optical network interface card (ONIC) having a plurality of first optical interfaces and being operated in a facility protection configuration. Optical fibers are connected to each of the first optical interfaces for sending and receiving synchronous optical networking (SONET)/synchronous digital hierarchy (SDH) communications and the first card experiences non-instantaneous performance deterioration. A second, untroubled ONIC is provided having a plurality of second optical interfaces and being operated in an equipment protection configuration. The second card being provisioned in a way such that the second optical interfaces protect each of the first optical interfaces. The optical fibers are moved from the first card to the second card such that traffic is switched away for all of the optical interfaces. The first card is replaced with a third, untroubled card having a plurality of third optical interfaces and being operated in a facility protection configuration. The second card is provisioned in a way such that the second optical interfaces protect each of the third optical interfaces. The optical fibers are then moved from the second card to the third card such that traffic is switched by the third optical interfaces.

The subject matter described herein for providing virtual 1:N automatic protection switching and dynamic, in service configuration change for optical network interface equipment may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Virtual 1:N

In order to address the shortcomings described above associated with conventional APS, the subject matter herein includes methods, systems, and computer readable media for providing automatic protection switching in optical network interface equipment using virtual 1:N protection. In contrast to conventional 1:N protection schemes where a single protecting interface is shared by multiple working interfaces requiring the use of complex protocols to ensure synchronization between various entities, virtual 1:N protection maintains a 1-to-1 ratio between working and protecting interfaces yet simultaneously associating multiple (i.e., N) working cards with a single shared protection card. As a result, virtual 1:N is cheaper to implement than conventional 1:N protection because it requires fewer expensive components (i.e., a single data payload processor to protect N working interfaces v. N data payload processors). And while the decrease in data processors must be offset by an increase in the number of protecting interfaces, the cost of the additional interfaces is significantly less than the cost of N−1 data processors. Moreover, virtual 1:N protection provides greater reliability than conventional 1:N protection because, in the event of an optical interface (as opposed to card) failure, one protecting interface failure only affects one working interface when using virtual 1:N protection, whereas the failure of one protecting interface affects N working interfaces when using conventional 1:N protection. Therefore, virtual 1:N protection effectively bypasses the need to use expensive, complex, and cumbersome conventional 1:N APS protocols by maintaining a 1-to-1 ratio between working and protecting interfaces, while leveraging the efficiency of a 1:N ratio of protecting cards to working cards. A more detailed description of the features of virtual 1:N protection will now be described below.

Because the only factor limiting the number of ports on the protection card in a virtual 1:N protection scheme is the physical space and/or processing power of the protection card, current manufacturers of optical network interface cards may support as many as 32 physical ports per card, although there is no logical limit. In contrast, the number of N working ports supported by a single, shared protecting port using conventional 1:N protection is constrained by the available bits inside of the K1 and K2 bytes of the APS protocol. As such, conventional 1:N protection is limited to 14 protected ports per protecting port whereas virtual 1:N is not.

Figure 1A:
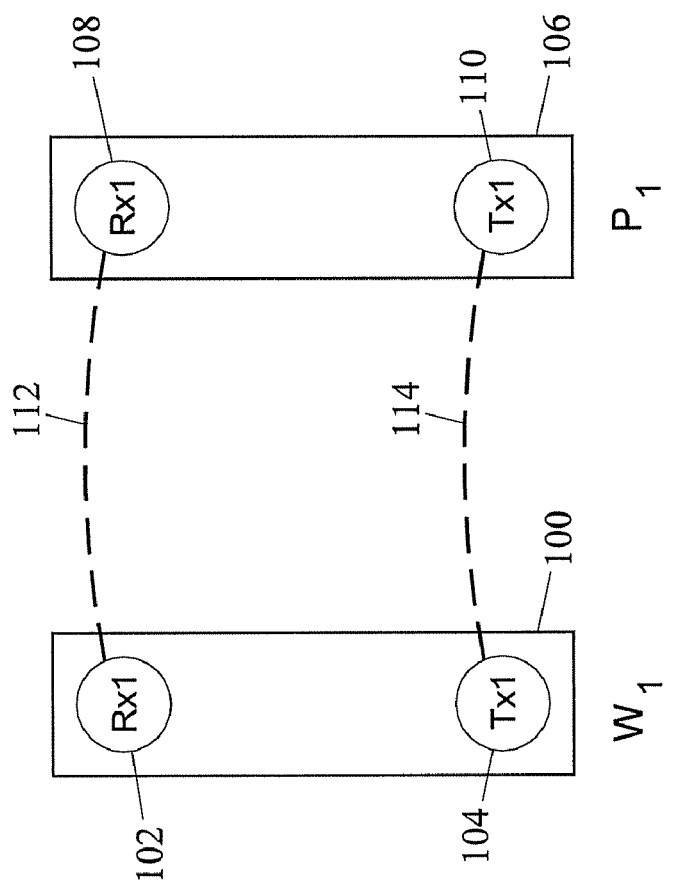
FIG. 1A is a diagram illustrating an exemplary conventional equipment protection scheme.
Figure 1B:
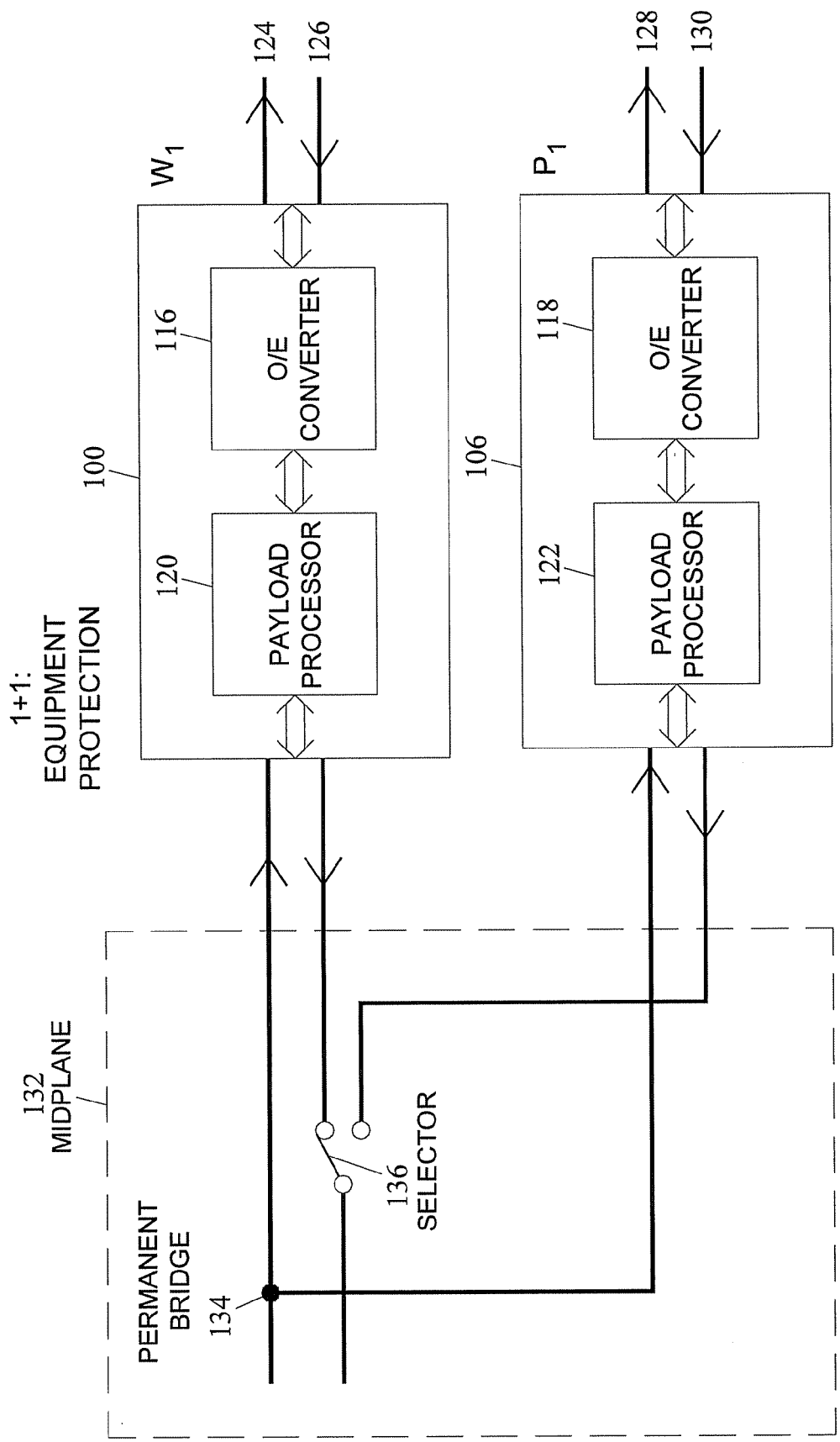
FIG. 1B is a more detailed diagram illustrating a schematic view of an exemplary conventional equipment protection scheme.
Figure 2:
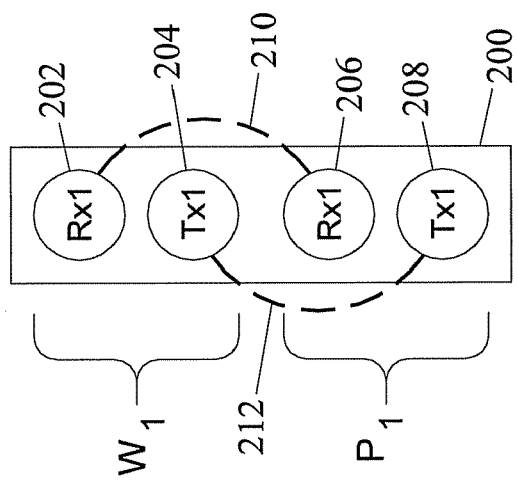
FIG. 2 is a diagram illustrating an exemplary conventional facility protection scheme.
Figure 3:
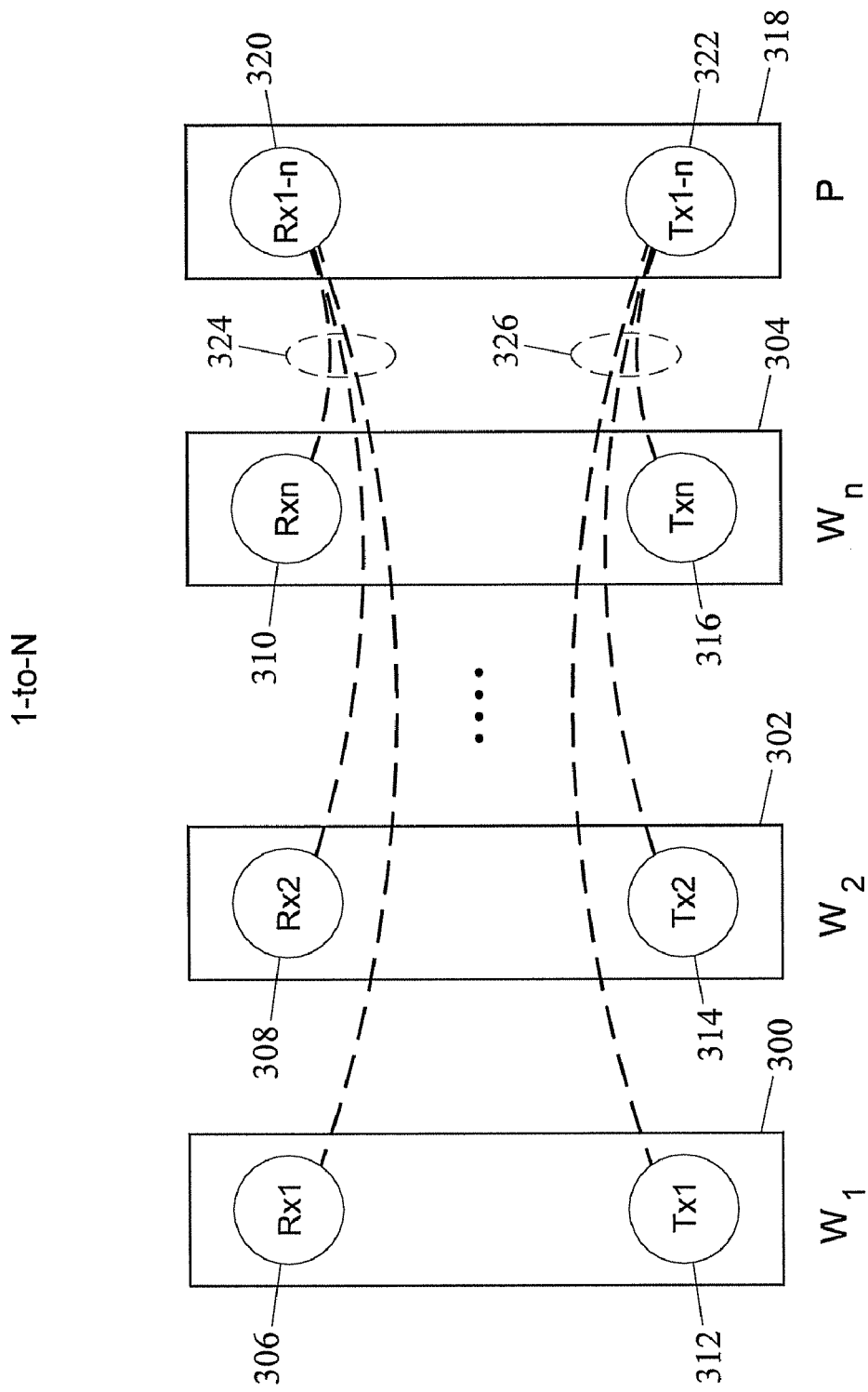
FIG. 3 is a diagram illustrating an exemplary conventional 1:N protection scheme.
Figure 4:
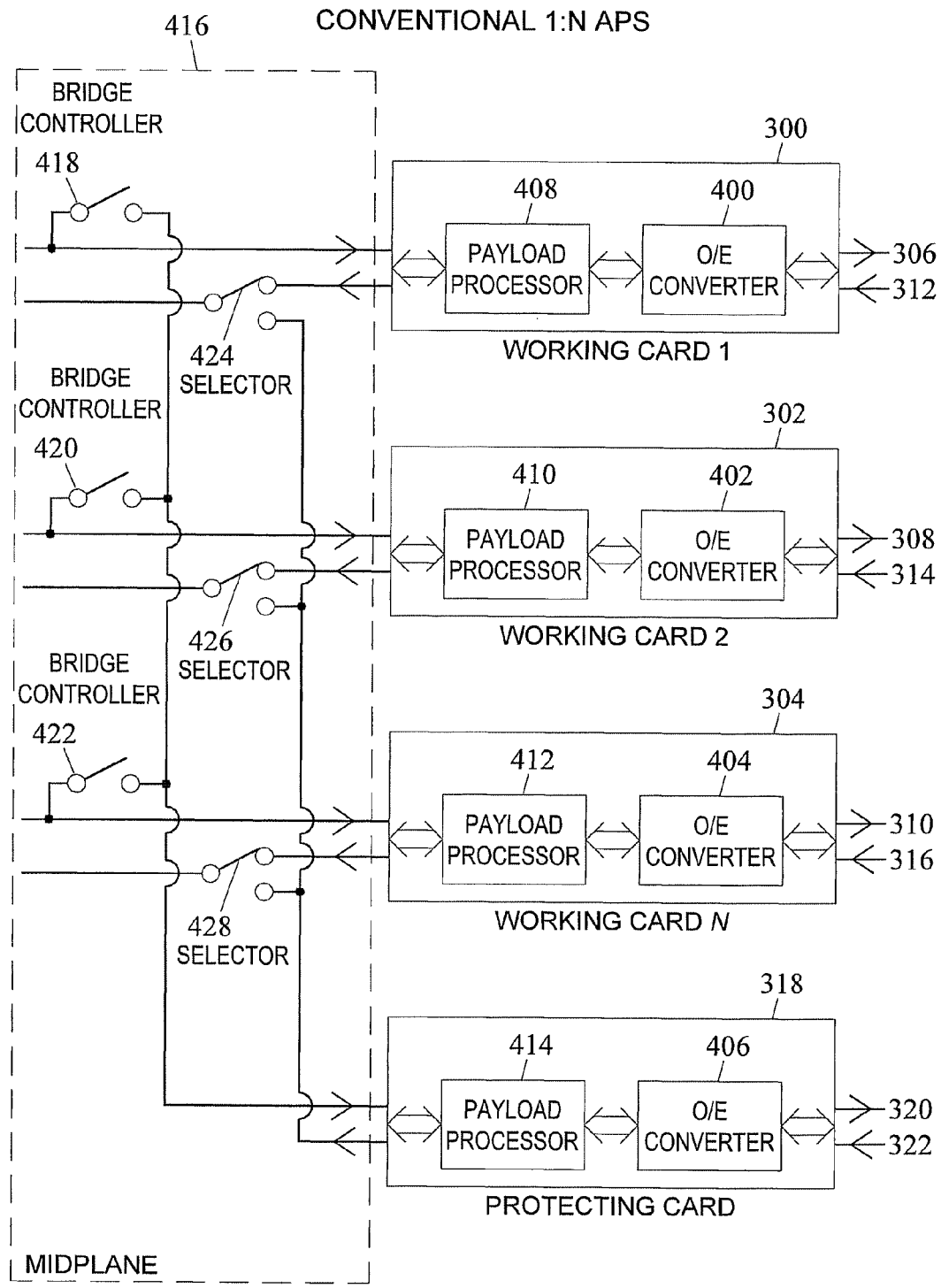
FIG. 4 is a more detailed diagram illustrating a schematic view of an exemplary conventional 1:N protection scheme.
Figure 5A:
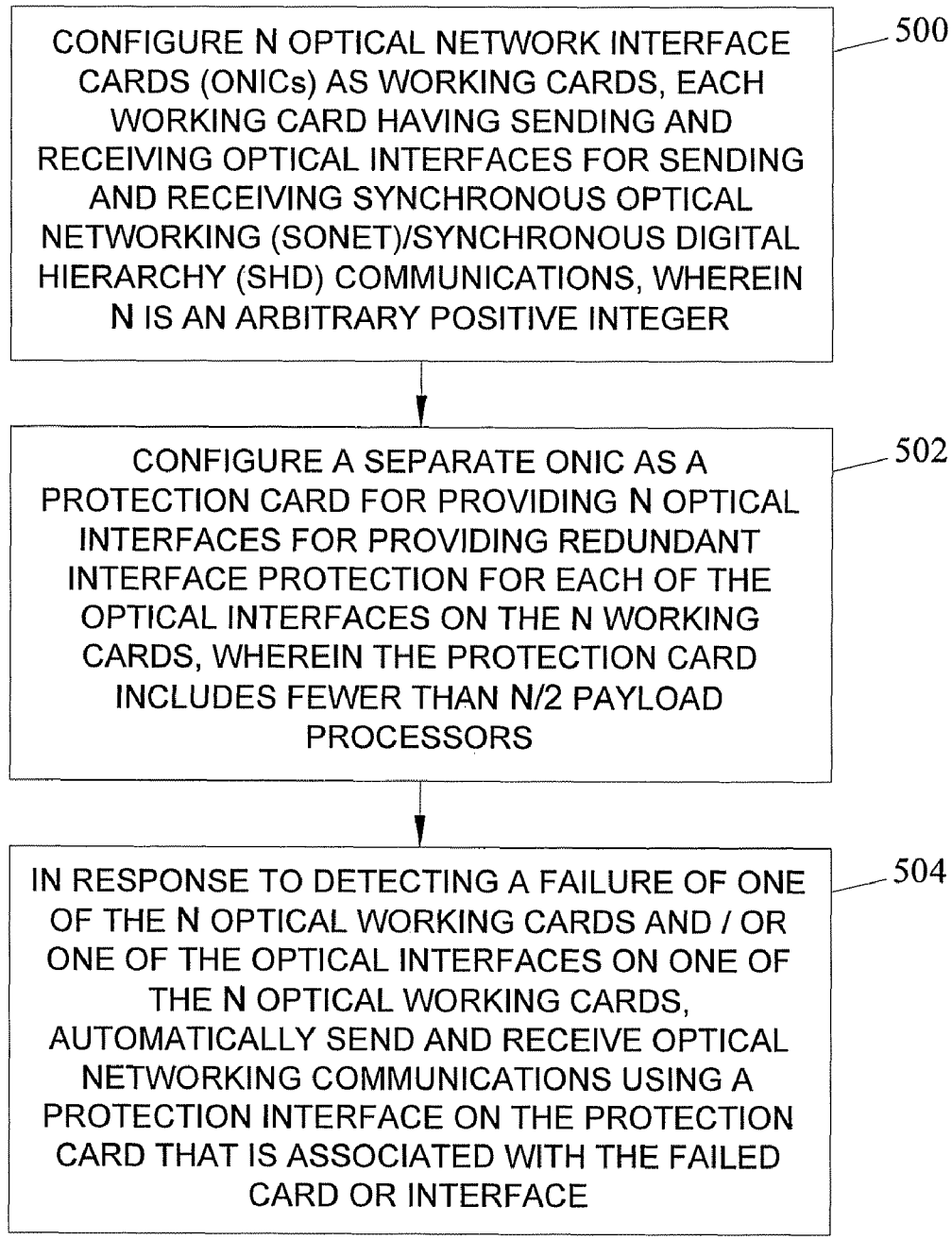
FIGS. 5A and 5B are a flow chart showing exemplary steps for providing virtual 1:N automatic protection switching for optical network interface equipment according to an embodiment of the subject matter described herein.

FIG. 5A is a flow chart showing exemplary steps for providing automatic protection switching for optical network interface equipment according to an embodiment of the subject matter described herein. Referring to FIG. 5A, in step 500, N optical network interface cards are configured as working cards where N is a positive integer, preferably greater than one. Each working card has sending and receiving optical interfaces for sending and receiving SONET/SDH communications. For example, referring to FIG. 6A, ONICs 300, 302, and 304 may be configured as working cards, where each of working cards 300-304 includes a transmitting and a receiving interface.

In step 502, a separate ONIC is configured as a protection card and includes at least N optical interfaces. Each of the N protecting interfaces provides redundant interface protection for one of the optical interfaces on the N working cards. The protection card also includes fewer than N/2 payload processors. It is appreciated that the greatest cost savings may be achieved when one payload processor is associated with protecting N optical interfaces for large values of N. However, because conventional ONICs typically include one payload processor per card (with each card supporting two ports at a minimum), multiple payload processors being less than N/2 may also be used on a protection card implementing virtual 1:N protection without departing from the scope of the subject matter described herein and still achieve a cost savings over conventional 1:N protection. For example, ONIC 600 is configured as a protection card having N protecting interfaces 602-620 that are associated with protecting, in a 1-to-1 ratio, working interfaces 306-316. It is appreciated that protecting card 600 may include a single data payload processor, as shown in FIG. 6B.

In step 504, in response to detecting a failure of one of the N optical working cards and/or one of the optical interfaces on one of the N optical working cards, a protection interface on the protection card that is associated with the failed card or interface is used to automatically send and receive optical networking communications. For example, in response to detecting failure of working interface 306, network communications may be automatically handled by its associated protecting interface 602.

Figure 5B:
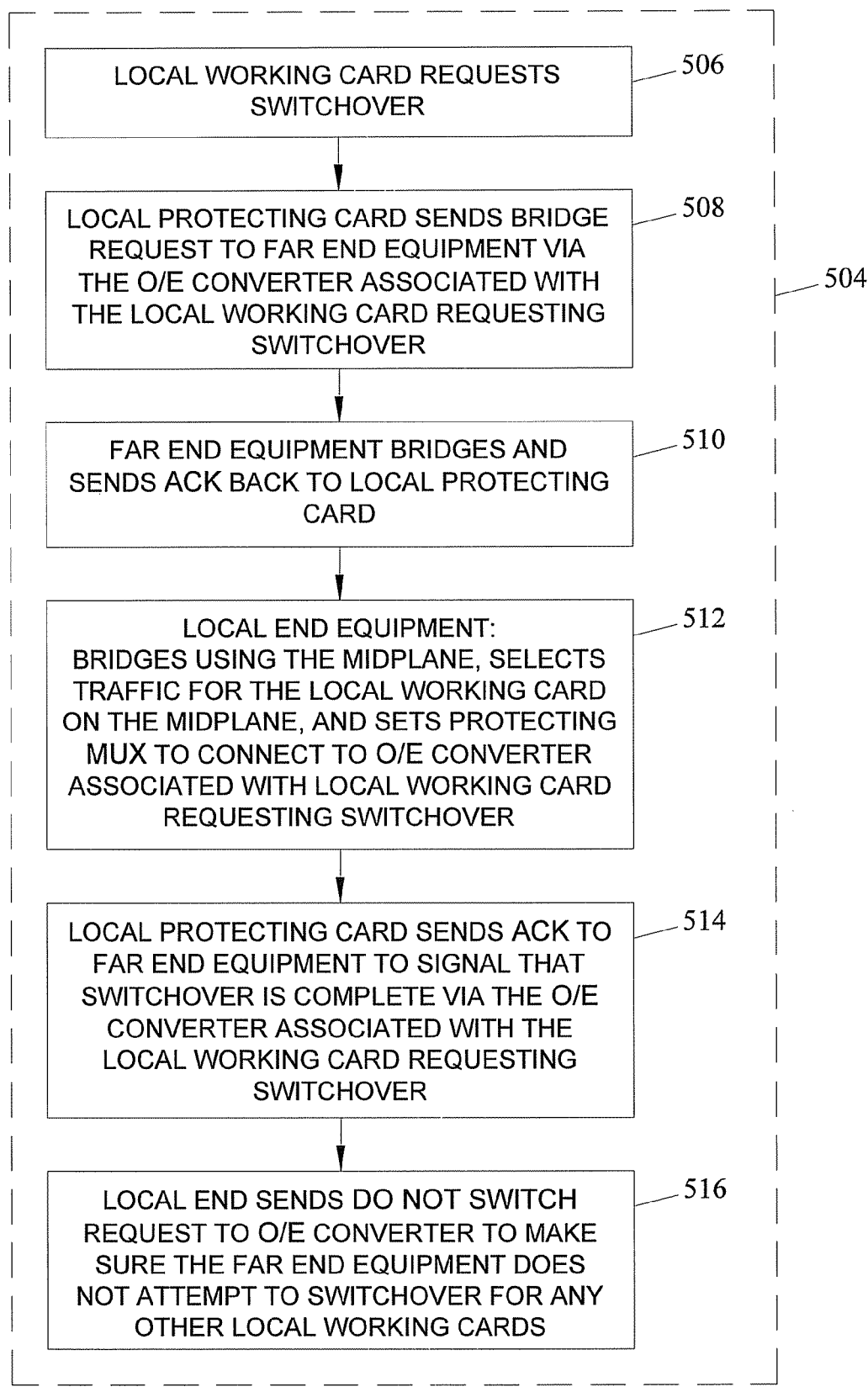

A more detailed switchover sequence as performed in step 504 in FIG. 5A is shown in FIG. 5B. Referring to FIG. 5B, in step 506, a local working card requests switchover. Since the protecting card can only protect 1 working card at a time, a mechanism must be devised such that when the protecting card is protecting one of the working cards, the far end does not attempt to switchover for other cards. This can be easily done by issuing a "no switch" command to the far end. For example, in step 508, the local protecting card sends a bridge request to the far end equipment.

In step 510, far end may bridge and return an acknowledgement message (ACK).

In step 512, local end equipment bridges and selects traffic (on the midplane) for the working card requesting switchover, then sets the protecting card MUX to connect to the O/E converter associated with that working card.

In step 514, local end sends an ACK to the far end equipment via the O/E converter associated with the working card requesting switchover to inform far end to signal switchover complete.

In step 516, local end sends a "Do Not Switch" request via the O/E converter associated with each of the working cards no requesting switchover in order to make sure the other far end equipment not to attempt to switchover. It is appreciated that the "Do Not Switch" request may include anything that would prevent the far end from switchover, such as a "Lockout Protection" command taught by the Bellcore SONET standard mentioned above. In an alternative example, the "Do Not Switch" request may even include turning off the transmitter on the O/E converter, thus creating a Loss of Signal condition on the far end protecting card which would prevent any switchover attempt.

Figure 6A:
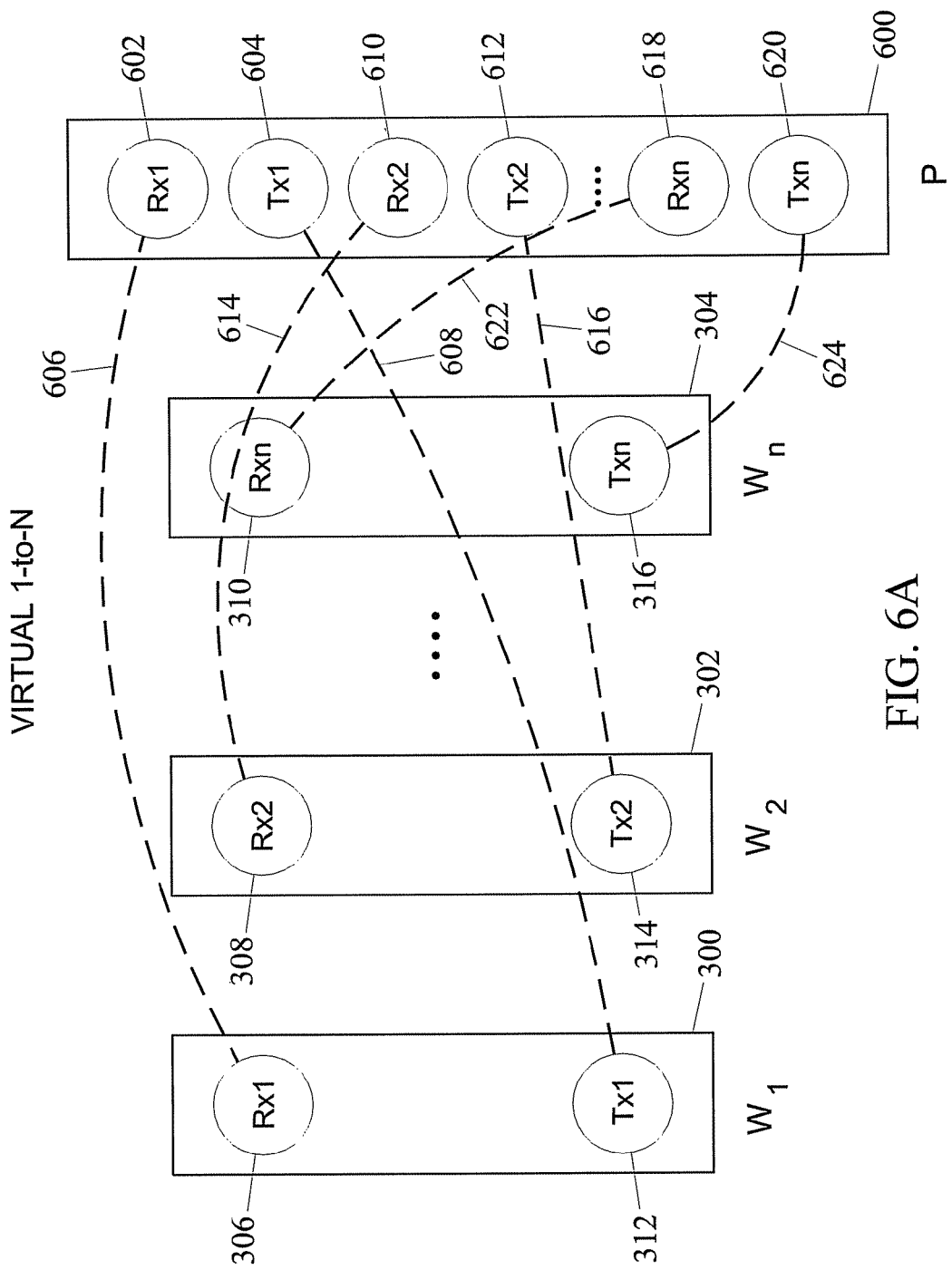
FIG. 6A is a diagram of an exemplary virtual 1:N protection scheme for providing automatic protection switching for optical network interface equipment according to an embodiment of the subject matter described herein.
Figure 6B:
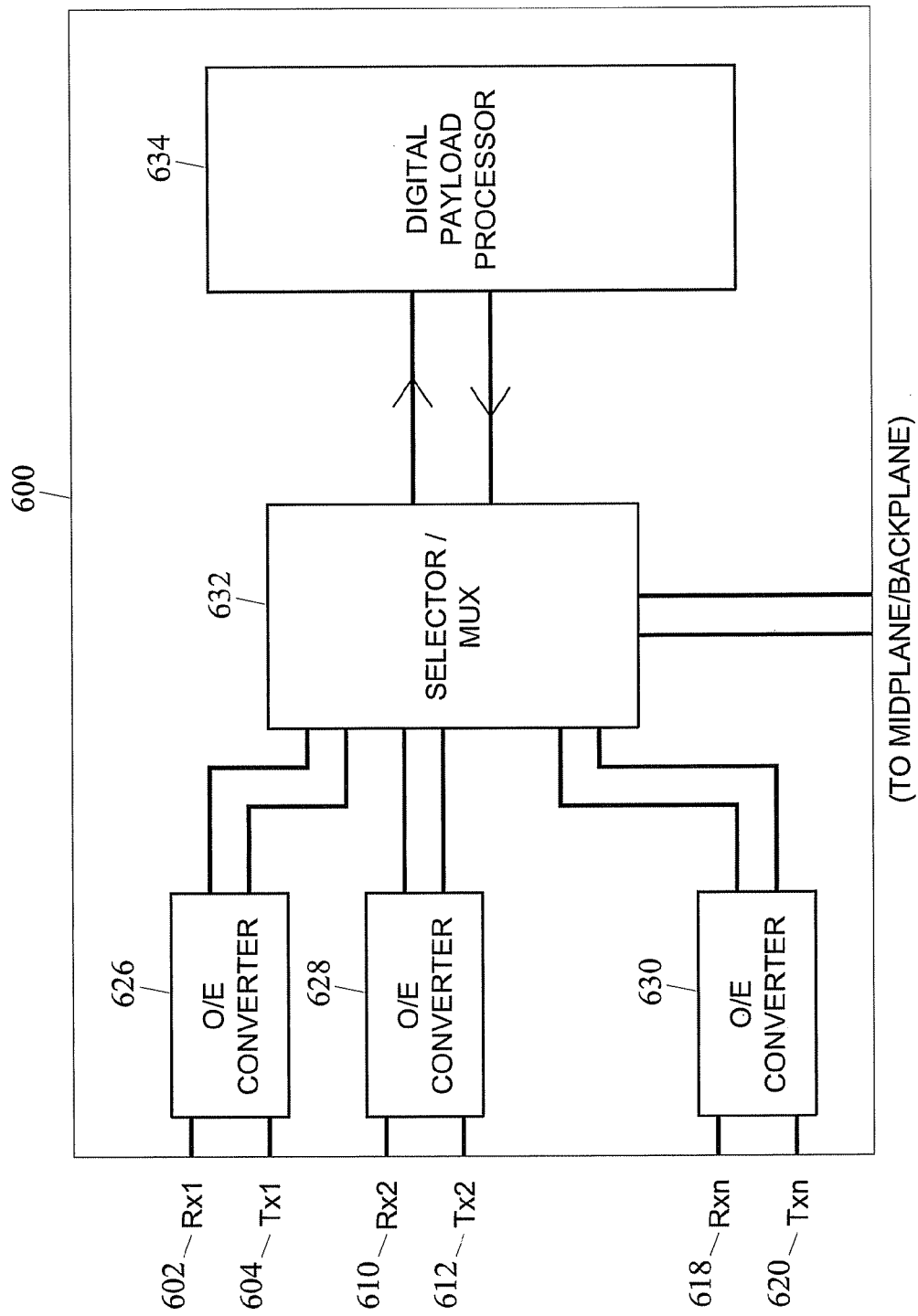
FIG. 6B is a functional block diagram of an exemplary optical network interface device suitable for providing virtual 1:N automatic protection switching for optical network interface equipment according to an embodiment of the subject matter described herein.

FIG. 6A is a diagram of an exemplary virtual 1:N protection scheme for providing automatic protection switching for optical network interface equipment according to an embodiment of the subject matter described herein. Referring to FIG. 6A, a plurality of working ONICs 300, 302 and 304 may each contain a receiving optical interface, such as receiving optical interfaces 306, 308, and 310, respectively, as well as a transmitting optical interface, such as transmitting optical interfaces 312, 314, and 316, respectively. Working cards 300-304 may also be connected to optical fibers for sending and receiving SONET/SDH network communications.

Protection card 600 may include a plurality of receiving protection interfaces and transmitting protection interfaces in a 1-to-1 ratio with working interfaces 306-316 on working cards 300-304. For example, receiving protection interface 602 may protect interface 306 and transmitting protection interface 604 may protect interface 312. These associations are indicated by dashed lines 606 and 608, respectively. Similarly, receiving protection interface 610 may protect interface 308 and transmitting protection interface 612 may protect interface 314. These associations are indicated by dashed lines 614 and 616, respectively. Lastly, receiving protection interface 618 may protect interface 310, and transmitting protection interface 620 may protect interface 316. These associations are indicated by dashed lines 622 and 624, respectively. Thus, one protection card 600 may protect N working cards (e.g., 300, 302, and 304) while maintaining a 1-to-1 ratio of working interfaces-to-protection interfaces.

FIG. 6B is a functional block diagram of an exemplary optical network interface device implementing virtual 1:N automatic protection switching according to an embodiment of the subject matter described herein. Referring to FIG. 6B, protection card 600 may include a plurality of receiving and transmitting optical interfaces for optically sending and receiving information to or from other network devices. For example, optical network interfaces 602, 604, 610, 612, 618, and 620 may include any suitable optical interfaces implementing an optical switching protocol/stack that may be implemented on a ONIC associated with a suitable optical communications medium, such as fiber optic cable. Each of optical interfaces 602, 604, 610, 612, 618, and 620 may be associated with an optical/electrical (OIE) converter for converting between optical and electrical signals. For example, interfaces 602 and 604 may be associated with O/E converter 626, interfaces 610 and 612 may be associated with O/E converter 628, and interfaces 618 and 620 may be associated with O/E converter 630. Conversion between optical and electrical signals may be necessary in order to communicate with various internal electrical components of network device 600. Each of O/E converters 626-630 may be connected to a selector/multiplexer (MUX) 632 via a communications bus for selecting which of optical network interfaces 602, 604, 610, 612, 618, and 620 is "occupied" at a given time. As used herein, only one optical network interface may be occupied at a given time and selector/MUX 632 may enforce this limitation on internal communications.

Digital payload processor 634 may also be associated with selector/MUX 632 for sending and receiving optical interfaces for sending and receiving SONET/SDH communications. As mentioned above, payload processor 634 is typically the most expensive component of any optical interface card, and therefore, the virtual 1:N protection scheme described herein achieves cost reduction over conventional 1:N protection by reducing the number of payload processors necessary for protecting N optical interfaces (e.g., one).

Additionally, a plurality of ONICs may be connected together via a suitable communications bus, such as a midplane or backplane. Each card may have two "sides," a first side being the line side that faces the external optical equipment and a second side being the system side connecting to the midplane or backplane internal communication bus. When a connection is made between two cards via a midplane, this connection is called a "bridge." As used herein, a bridge refers to a scenario in which the midplane (or backplane) transmits identical data to both cards.

Conventionally, selectors are located on the midplane and the interface cards do not have selectors located on them. However, as described above, according to the subject matter described herein for virtual 1:N APS, selector/MUX 632 may be located on protecting card 600 for facilitating virtual 1:N automatic protection switchover.

Figure 6C:
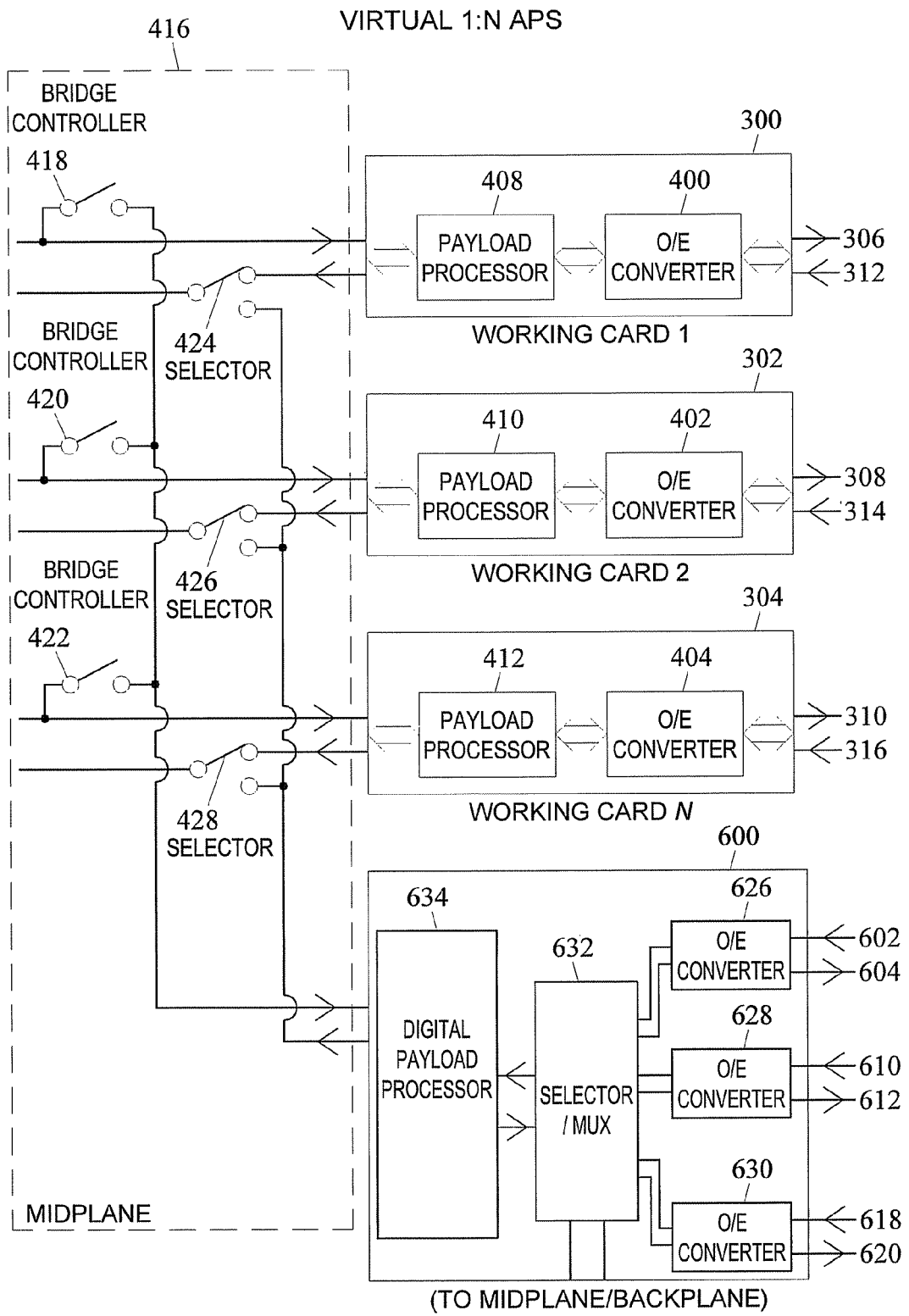
FIG. 6C is a more detailed diagram illustrating a schematic view of an exemplary equipment protection scheme according to an embodiment of the subject matter described herein.

FIG. 6C is a more detailed diagram illustrating a schematic view of an exemplary conventional equipment protection scheme according to an embodiment of the subject matter described herein. In a conventional 1+1 protection architecture, in the outbound direction, system side data is bridge connected to the outbound interfaces of both working and protecting interfaces. In the inbound direction, a selector (located on the midplane) controls which interface to receive data from. The bridge is continuous, meaning that the connection is made as soon as the protection paring is established and will not be released as long as there is no pairing change. Since both the far end and local equipment bridge their respective outbound data to both working and protecting interfaces, switch over traffic is a simple action of flipping the selector. Local and far end equipment may perform switchover independently of each other.

In contrast to 1+1 protection, in a conventional 1:N architecture, multiple working interfaces are associated with a single protecting interface, and therefore, continuous bridging does not exist. As a result of the lack of continuous (i.e., permanent) bridging between working interfaces and their protecting interface, switchover must follow a strict protocol to avoid loss of data. For example, a typical 1:N switchover sequence may begin when the local equipment sends a switchover request to far end equipment for working interface N. Far end equipment may then validate the switchover request, bridge for interface N, and send an acknowledgement message (ACK) back to local equipment. Upon receiving the ACK, local equipment may select and bridge for interface N. Local equipment may then inform the far end equipment to select for interface N (e.g., select notification). Once far end equipment receives the select notification from local equipment, far end may make the selection and return an ACK to local equipment.

While the conventional 1:N switchover sequence described above may represent an ideal situation where all requests can be carried out without other conflicts, the sequence can be complicated if a request cannot be honored due to conflicts with existing conditions. For example, it is not uncommon for both local and far end equipment to send switchover requests to each other simultaneously, resulting in a potential racing condition. This may be caused by a fiber being cut between the local and far end equipment, resulting in a loss of signal for both ends at the same time. As a result, compliance with conventional 1:N APS protocols requires that switchover of local end optical network equipment is dependent on the state and/or actions of corresponding far end equipment and therefore requires coordination and/or synchronization with the far end equipment.

Thus, according to the subject matter described herein for virtual 1:N protection, instead of having one O/E converter, the protecting card has N O/E converters connected to the payload processor via a MUX. The MUX selects which O/E converter to connect to depending on which working card is being protected. This design is superior to the conventional 1:N APS because it can interface with the N protecting cards at the far end to form N pairs of 1+1 bidirectional protection groups. Referring to FIG. 6C, it may be appreciated that selector/MUX 632 is located on protecting card 600 in addition to selectors 440-444 located on midplane 414. Selector/MUX 632 may select between optical network interfaces 602, 604, 610, 612, 618, and 620, which are not used in conventional 1:N protection schemes.

Dynamic, In-Service Configuration Change

In addition to the method and system described above for providing virtual 1:N automatic protection switching for optical network interface equipment, a method and system for providing dynamic, in-service configuration change between equipment and facility protection schemes in optical network interface equipment are described hereinbelow. In contrast to virtual 1:N protection, performing a dynamic, in-service configuration change between equipment and facility protection schemes does not require any new hardware. As a result, using dynamic, in-service configuration change between equipment and facility protection scheme as described herein to perform APS for optical network equipment is essentially free for operators to implement. However, dynamic, in-service configuration change cannot offer the same degree of reliability that virtual 1:N can because, unlike virtual 1:N, dynamic, in-service configuration change cannot perform APS without suffering any traffic loss for instantaneous performance degradation (failure or crash) of a working card because there would not be enough time to perform the configuration change. Thus, dynamic, in-service configuration change is most suitable as an alternative to virtual 1:N protection in certain environments.

Traditionally, a 1+1 protection APS scheme is a fixed configuration that cannot be easily changed once provisioned. Therefore, it is generally believed in the industry that the choice between equipment protection and facility protection represents a choice between two mutually exclusive configurations (i.e., black or white). Optical network interface equipment operators believe they must either choose equipment protection for its high reliability despite its high cost, or choose facility protection for its lower cost while accepting its lower reliability. Because it is believed in the industry that an equipment failure would result in a long service interruption in either equipment or facility protection schemes, few efforts have been made to address the shortcomings of facility protection.

Figure 7:
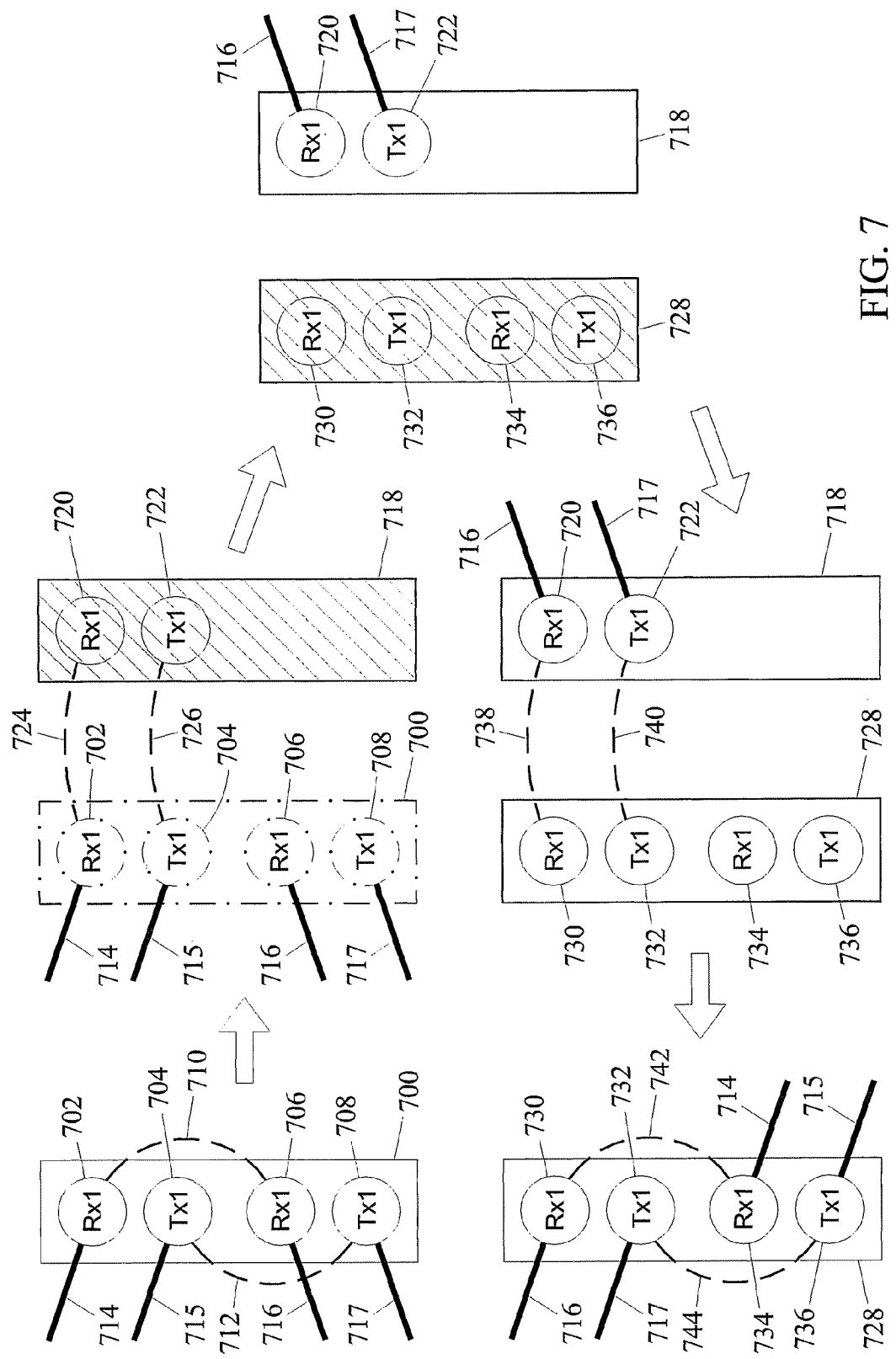
FIG. 7 is a diagram showing exemplary transitions for performing dynamic, in service protection configuration change between equipment protection and facility protection according to an embodiment of the subject matter described herein.

FIG. 7 is a diagram showing exemplary transitions for dynamic, in service protection configuration change between equipment protection and facility protection according to an embodiment of the subject matter described herein. Referring to FIG. 7, a first working card 700 may be configured for facility protection. Therefore, working card 700 may include a first pair of optical working interfaces 702 and 704 for receiving and transmitting optical communications, respectively. Each of optical working interfaces 702 and 704 may be protected by corresponding protection interfaces 706 and 708, as indicated by dashed lines 710 and 712, respectively. Additionally, optical fibers are connected to each of receiving and transmitting working interfaces 702 and 704 as indicated by optical fibers 714 and 716, respectively.

Next, working card 700 may start to show signs of non-instantaneous performance deterioration, such as overheating, memory shortage, etc. and, therefore, network traffic processed by card 700 may be negatively affected. It is important to distinguish between a catastrophic component or interface/link failure and other, slower types of performance deterioration. As used herein, the term, "non-instantaneous performance deterioration" refers to an optical network interface and/or ONIC experiencing a negative change in one or more performance characteristics occurring over a perceptible duration of time. While this time period may be short, it is typically on the order of minutes, rather than seconds or milliseconds.

Because working interfaces 702 and 704 and protection interfaces 706 and 708 are both located on the ONIC 700, simply processing traffic using protection interfaces 706 and 708 in response to performance deterioration of card 700 would likely result in traffic disruption using conventional 1+1 APS because protecting interfaces 706 and 708 would also be affected by the performance deterioration of card 700. As described above, this scenario illustrates why facility protection is a less reliable APS method than equipment protection, for example.

According to the subject matter described herein, a method for dynamically changing between equipment protection and facility protection configurations while in service (i.e., without traffic disruption) is disclosed. According to the method, a new ONIC may be added to an available slot and the new card may be provisioned in such a way that each of its optical interfaces protects a working interface on the troubled card. For example, new protection card 718 may be added to an available slot and provisioned such that new protection interfaces 720 and 722 protect working interfaces 702 and 704 on troubled card 700, as indicated by dashed lines 724 and 726, respectively.

Next, optical fibers 714 and 716 are moved from working interfaces 702 and 704 on troubled card 700 to protection interfaces 720 and 722 on newly installed protection card 718. After a signal is restored on protection card 718, traffic is switched to protection card 718 via fibers 714 and 716. Additionally, after all traffic is switched away from troubled card 700, troubled card 700 is removed and replaced with a new working card. For example, replacement working card 728 may be installed in the slot formerly occupied by card 700. Replacement working card 728 may similarly include a receiving and transmitting optical interfaces pair 730 and 732 and a protecting interfaces pair 734 and 736, respectively.

Next, protection card 718 may be provisioned in a way such that protecting receiving interface 720 protects working receiving interface 730 and protecting transmitting interface 722 protects working transmitting interface 732, as indicated by dashed lines 738 and 740, respectively.

Finally, working card 728 may be returned (from equipment protection) to facility protection by provisioning in a way such that protecting receiving interface 734 protects working receiving interface 730 (both being located on card 728) and protecting transmitting interface 736 protects working transmitting interface 732 (both being located on card 728), as indicated by dashed lines 742 and 744, respectively. Optical fibers 714 and 716 may then be disconnected from protecting ports 720 and 722 and moved to interfaces 730 and 732. Traffic may then be switched solely using working card 728 operated using facility protection without disrupting traffic.

As a result, the method for performing a dynamic, in service protection configuration change between equipment protection and facility protection according to the subject matter described herein may improve the reliability of facility protection at no extra cost by providing a means for users/administrators to replace a card operated using facility protection without losing traffic. While this method may not prevent outage for major card failures, such as hardware component failure or CPU crashes, it may provide an improvement over cases of minor issues, such as component deterioration, overheating, or memory shortage.

Figure 8A:
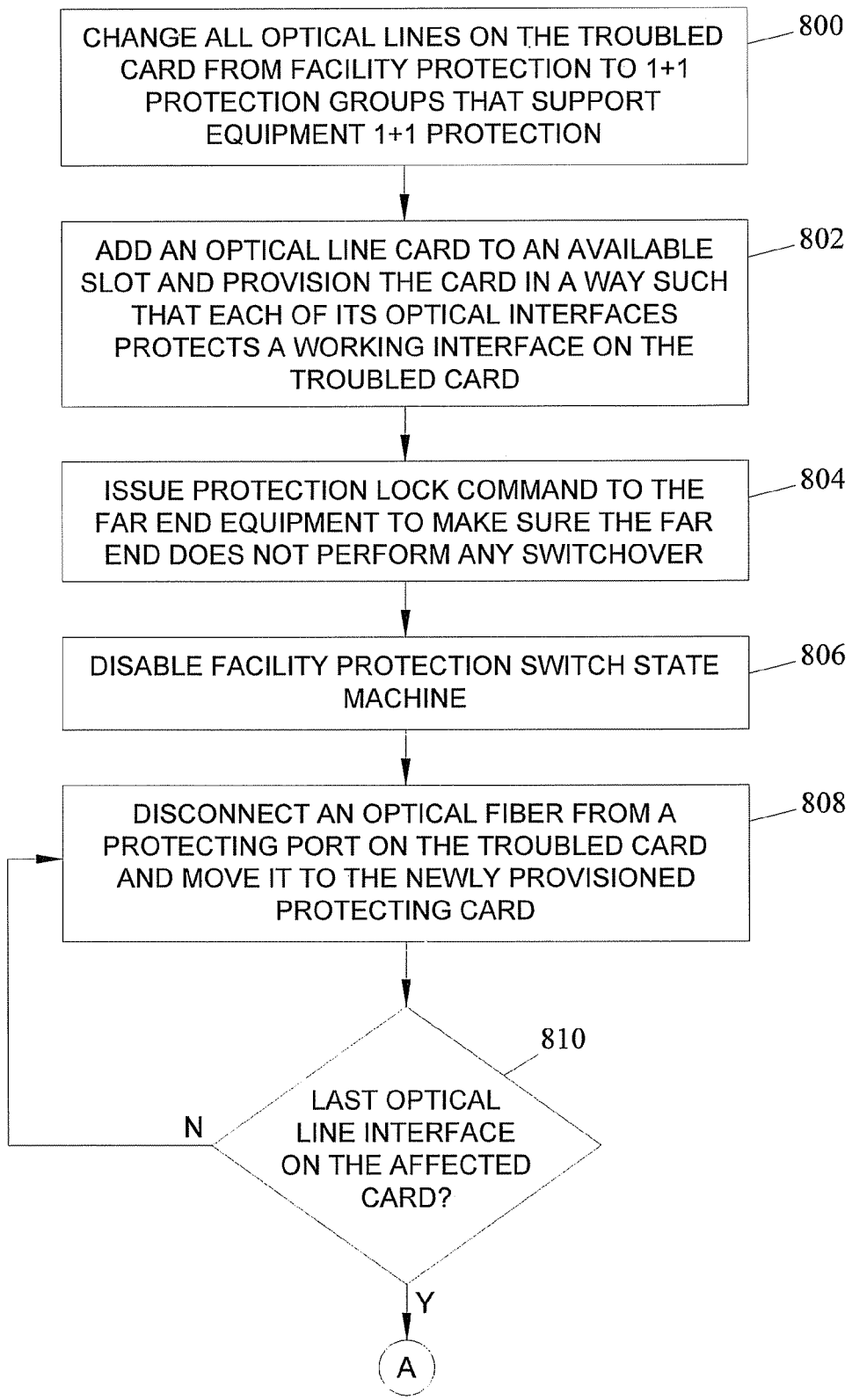
FIGS. 8A and 8B are a flow chart of exemplary steps for performing dynamic, in service protection configuration change between equipment protection and facility protection according to an embodiment of the subject matter described herein.
Figure 8B:
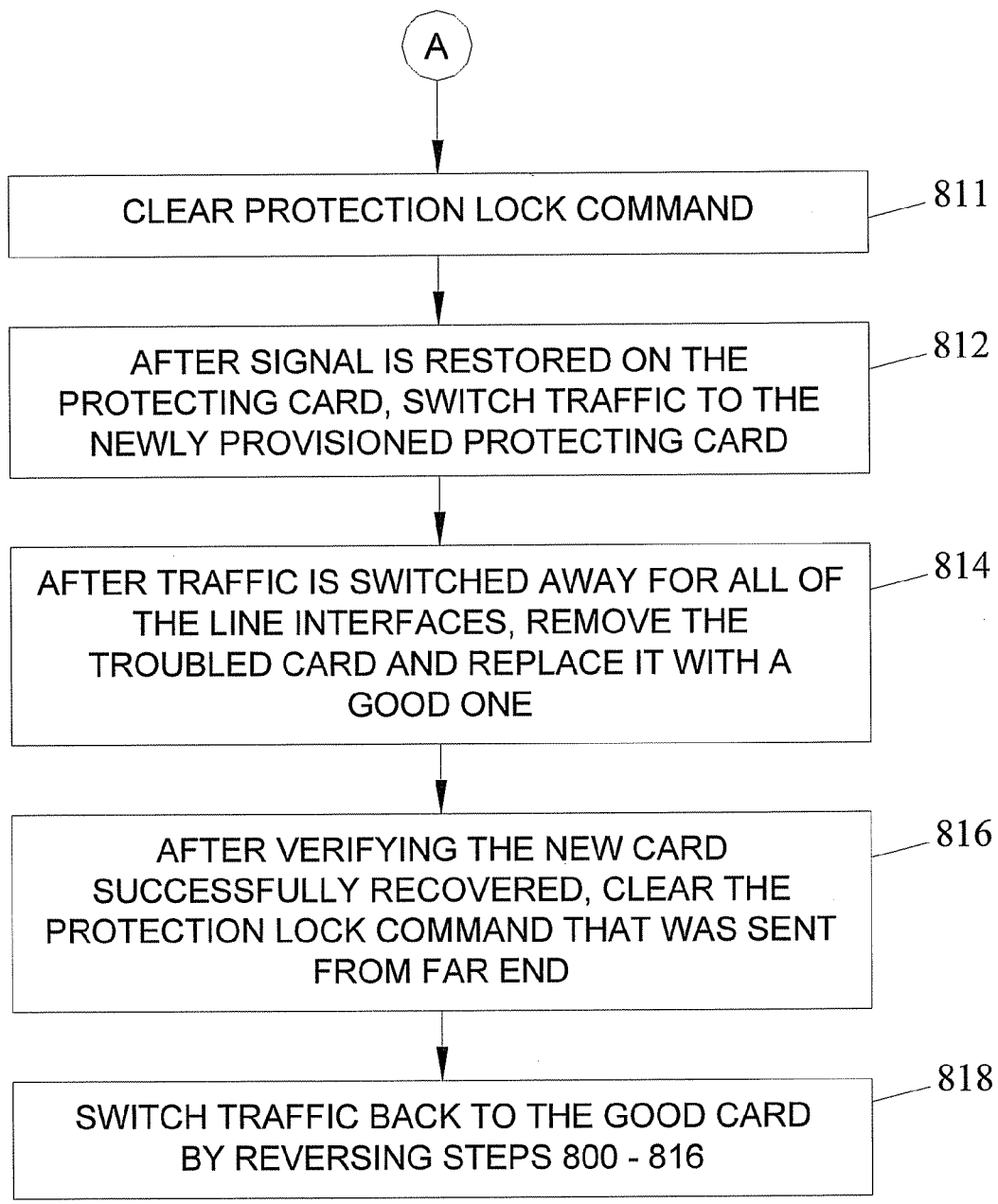

FIGS. 8A and 8B are a flow chart of exemplary steps for performing dynamic, in service protection configuration change between equipment protection and facility protection according to an embodiment of the subject matter described herein. Referring to FIG. 8A, in step 800, all optical interfaces under the current card may be assigned to 1+1 protection configuration groups that support equipment 1+1 protection. For example, card 700 may changed from facility protection to equipment protection in the first two steps in the sequence shown in FIG. 7.

In step 802, an optical interface card is added to an available slot and the card is provisioned in a way such that each of its optical interfaces protects a working interface on the troubled card. For example, protection card 718 is added to an available slot and configured such that optical interfaces 720 and 722 protect interfaces 714 and 715 on card 700, respectively.

In step 804, a Protection Lock command may be issued to the far end equipment to make sure that the far end equipment does not perform any switchover. For example, the Protection Lock command may be encoded as a special command that is communicated via the K1, K2 bytes that are embedded in the optical signal.

In step 806, the facility protection switch state machine is disabled.

In step 808, the optical fibers from the protecting ports are disconnected and moved to the newly provisioned protecting card. For example, optical fibers 716 and 717 may be disconnected from ports 706 (one by one) and 708 and moved to ports 720 and 722 on card 718.

Referring now to FIG. 8B, in step 810, it is determined whether step 808 has been performed on the last port on the affected card (i.e., all ports have been disconnected and their fibers moved the newly provisioned card). In other words, step 808 may be performed sequentially for each interface on the affected card. For example, in an embodiment (not shown) where card 700 includes 8, 16, 32, etc. ports, the optical fibers connected to all ports are moved to the newly provisioned card before proceeding. Once the last port has been disconnected and its fiber moved, control proceeds to step 811. In step 811, the Protection Lock command issued in step 804 is cleared.

In step 812, after a signal is restored to the protecting card, and traffic is switched to the newly provisioned card. For example, traffic may be switched using optical fibers 716 and 717 and ports 720 and 722 on newly provisioned protecting card 718.

In step 814, after traffic is switched away for all of the line interfaces, the troubled card may be removed and replaced with a good card. Alternately, the troubled card may remain in place and allowed to recover from a temporary condition (if possible) such as cooling off from overheating.

In step 816, after verifying that the new card is successfully recovered, the Protection Lock command is cleared (i.e., removed) that was sent from the far end equipment.

Finally, in step 818, traffic is switched back to the new card by reversing steps 800-816 described above. For example, ports 720 and 722 may be configured to protect ports 730 and 732, respectively, optical fibers 716 and 717 may then be moved back to ports 730 and 732, and finally, ports 734 and 736 may be configured to protect ports 730 and 732, respectively. Thus, the configuration of troubled card 700 may be dynamically changed, in service, from facility protection to equipment protection and back to facility protection, without data loss according to the subject matter described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing virtual 1:N automatic protection switching (APS) for optical network interface equipment, the method comprising:

configuring N optical network interface cards (ONICs) as working cards, each working card having sending and receiving optical interfaces, wherein N is an integer greater than 1;

configuring a ONIC as a protection card having M optical interfaces, wherein M is an integer greater than or equal to N, the M optical interfaces providing redundant interface protection for at least one of the optical interfaces on each of the N working cards, wherein providing redundant interface protection includes maintaining a one to one ratio between the M optical interfaces and the optical interfaces on each of the N working cards being protected; and in response to detecting a failure of one of the N working cards or a failure of one of the optical interfaces on one of the N working cards, automatically sending or receiving, using a protecting interface on the protection card that is associated with the failed card or interface, optical networking communications that would have been sent to or received by the failed card or interface.

2. The method of claim 1 wherein configuring N ONICs as working cards includes configuring each of the N ONICs for sending and receiving synchronous optical networking (SONET) communications.

3. The method of claim 1 wherein configuring N ONICs as working cards includes configuring each of the N ONICs for sending and receiving synchronous digital hierarchy (SDH) communications.

4. The method of claim 1 wherein configuring N ONICs as working cards includes configuring each of the N ONICs in a 1+1 equipment protection APS scheme.

5. The method of claim 1 wherein configuring the protection card includes configuring the protection card in a 1+1 equipment protection APS scheme.

6. The method of claim 1 wherein configuring the protection card includes configuring the protection card to include fewer than M payload processors.

7. The method of claim 1 wherein automatically sending and receiving optical networking communications using the protection interface includes electrically and/or electronically shunting the optical networking communications from the failed card or interface to the protection card.

8. The method of claim 1 wherein automatically sending and receiving optical networking communications that would have been sent to or received by the failed card or interface includes automatically transitioning the communications to the protection interface transparently to the far end equipment associated with the communications.

9. A system for providing virtual 1:N automatic protection switching (APS) for optical network interface equipment, the system comprising:

N optical network interface cards (ONICs) being configured as working cards, each working card having sending and receiving optical interfaces, wherein N is an integer greater than 1; and a ONIC being configured as a protection card having M optical interfaces, wherein M is an integer greater than or equal to N, the M optical interfaces fix providing redundant interface protection for at least one of the optical interfaces on each of the N working cards, wherein providing redundant interface protection includes maintaining a one to one ratio between the M optical interfaces and the optical interfaces on each of the N working cards being protected, wherein in response to detecting a failure of one of the N working cards or a failure of one of the optical interfaces on one of the N working cards, optical networking communications that would have been sent to or received by the failed card or interface are automatically sent or received using a protecting interface on the protection card that is associated with the failed card or interface.

10. The system of claim 9 wherein the N ONICs configured as working cards are each configured for sending and receiving synchronous optical networking (SONET) communications.

11. The system of claim 9 wherein the N ONICs configured as working cards are each configured for sending and receiving synchronous digital hierarchy (SDH) communications.

12. The system of claim 9 wherein the N ONICs configured as working cards are configured in a 1+1 equipment protection APS scheme.

13. The system of claim 9 wherein the ONIC configured as a protection card is configured in a 1+1 equipment protection APS scheme.

14. The system of claim 9 wherein the ONIC configured as a protection card includes fewer than M payload processors.

15. The system of claim 9 wherein automatically sending and receiving optical networking communications using the protection interface includes electrically and/or electronically shunting the optical networking communications from the failed card or interface to the protection card.

16. The system of claim 9 wherein the ONIC configured as a protection card automatically transitions the communications to the protection interface transparently to the far end equipment associated with the communications.

17. A computer readable medium having stored thereon executable instructions that when executed by the processor of a computer control the computer to perform steps comprising:

configuring N optical network interface cards (ONICs) as working cards, each working card having sending and receiving optical interfaces, wherein N is an integer greater than 1;

configuring a ONIC as a protection card having M optical interfaces, wherein M is an integer greater than or equal to N, the M optical interfaces providing redundant interface protection for at least one of the optical interfaces on each of the N working cards, wherein providing redundant interface protection includes maintaining a one to one ratio between the M optical interfaces and the optical interfaces on each of the N working cards being protected; and in response to detecting a failure of one of the N working cards or a failure of one of the optical interfaces on one of the N working cards, automatically sending or receiving, using a protecting interface on the protection card that is associated with the failed card or interface, optical networking communications that would have been sent to or received by the failed card or interface.

18. A method for dynamic, in-service automatic protection switching (APS) configuration change between equipment protection and facility protection schemes, the method comprising:

detecting a first, troubled optical network interface card (ONIC) having a plurality of first optical interfaces and being operated in a facility protection configuration, wherein optical fibers are connected to each of the first optical interfaces for sending and receiving synchronous optical networking (SONET)/synchronous digital hierarchy (SDH) communications, wherein the first card is experiencing non-instantaneous performance deterioration;

providing a second, untroubled ONIC having a plurality of second optical interfaces and being operated in an equipment protection configuration, wherein the second card is provisioned in a way such that the second optical interfaces protect each of the first optical interfaces;

moving the optical fibers from the first card to the second card such that traffic is switched away for all of the optical interfaces;

replacing the first card with a third, untroubled card having a plurality of third optical interfaces and being operated in a facility protection configuration;

provisioning the second card in a way such that the second optical interfaces protect each of the third optical interfaces; and moving the optical fibers from the second card to the third card such that traffic is switched by the third optical interfaces.

* * * * *